(12) United States Patent
Frazier

(10) Patent No.: US 7,620,695 B2
(45) Date of Patent: Nov. 17, 2009

(54) STORING FIBRE CHANNEL INFORMATION ON AN INFINIBAND ADMINISTRATION DATA BASE

(75) Inventor: Giles R. Frazier, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 997 days.

(21) Appl. No.: 10/725,778

(22) Filed: Dec. 2, 2003

(65) Prior Publication Data

US 2005/0119989 A1 Jun. 2, 2005

(51) Int. Cl.
  *G06F 15/16* (2006.01)
  *G06F 15/177* (2006.01)
  *G06F 3/00* (2006.01)
(52) U.S. Cl. .................. 709/217; 709/220; 710/9
(58) Field of Classification Search .................. None
  See application file for complete search history.

(56) References Cited

U.S. PATENT DOCUMENTS

| | | | |
|---|---|---|---|
| 5,640,591 A * | 6/1997 | Rosenthal et al. ............... 710/3 |
| 5,991,828 A * | 11/1999 | Horie et al. .................... 710/8 |
| 6,138,161 A | 10/2000 | Reynolds et al. |
| 6,148,004 A | 11/2000 | Nelson et al. |
| 6,160,813 A | 12/2000 | Banks et al. |
| 6,185,203 B1 | 2/2001 | Berman |
| 6,400,730 B1 | 6/2002 | Latif et al. |
| 6,434,628 B1 * | 8/2002 | Bowman-Amuah .......... 714/48 |
| 6,529,963 B1 | 3/2003 | Fredin et al. |
| 6,728,789 B2 * | 4/2004 | Odenwald et al. ............... 710/3 |
| 6,748,459 B1 * | 6/2004 | Lin et al. ........................ 710/3 |
| 7,089,293 B2 * | 8/2006 | Grosner et al. ............... 709/217 |
| 7,206,314 B2 * | 4/2007 | Liao et al. ................... 370/401 |
| 7,236,496 B2 * | 6/2007 | Chung et al. ................. 370/401 |
| 7,240,106 B2 * | 7/2007 | Cochran et al. ............. 709/222 |

* cited by examiner

*Primary Examiner*—John B. Walsh
(74) *Attorney, Agent, or Firm*—Floyd A. Gonzalez; John E. Campbell

(57) ABSTRACT

Host computing systems with the ability to efficiently identify the Infiniband™ (IB) addressing parameters corresponding to Fibre Channel I/O devices that are accessible through IB-to-Fibre Channel adapters. An efficient means is described to store the IB addressing parameters pertaining to individual Fibre Channel I/O devices on a subnet administration database, and an efficient mechanism to recover from the database, the IB addressing parameters corresponding to all physical paths by which a desired Fibre Channel I/O device is accessible.

9 Claims, 3 Drawing Sheets

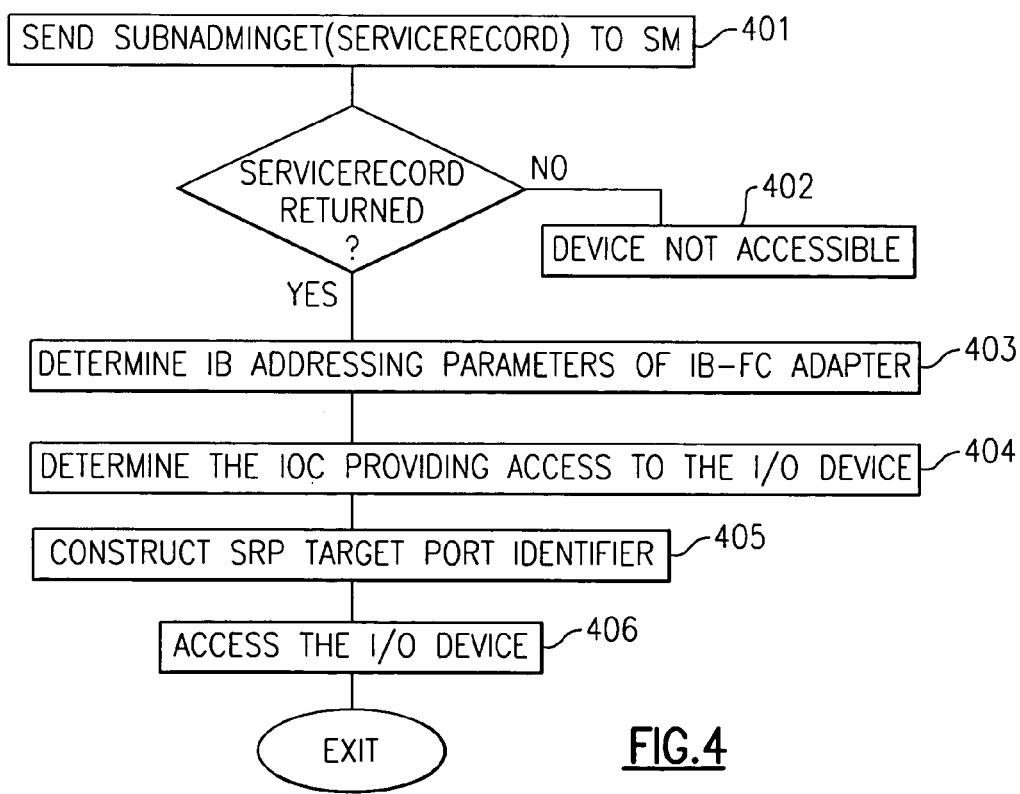

STORING FIBRE CHANNEL INFORMATION ON AN INFINIBAND ADMINISTRATION DATA BASE

BACKGROUND OF THE INVENTION

1. Field of the Invention

This invention relates to an Infiniband™ (IB) input/output unit (IOU) that enables a host computing system to access Input/Output (I/O) devices that conform to the Small Computer System Interface (SCSI) mapping onto Fibre Channel (FC). Such I/O devices are referred to as FCP I/O devices.

2. Description of Background

The following references pertain to this invention:
1. Information regarding IB subnet management and administration can be found in Chapters 14, 15 and 16 of Infiniband Architecture Specification, Volume 1, release 1.1, Infiniband Trade Association. Infiniband is a trademark of SYSTEM I/O doing business as InfiniBand Trade Association of Portland Oreg.
2. Information regarding Fibre Channel can be found in Fibre Channel-Framing and Signalling (FC-FS) rev 1.9, American National Standards Institute, Inc.
3. Information regarding FCP I/O devices can be found in Fibre Channel Protocol for SCSI, second version, (FCP-2), American National Standards Institute, Inc.
4. Information regarding the SCSI mapping onto IB can be found in SCSI Remote Direct Memory Access (RDMA) Protocol (SRP), rev 16a, American National Standards Institute, Inc. and
5. Information regarding SRP target port identifiers can be found in Fibre Channel HBA API (FC-HBA), rev 8, American National Standards Institute, Inc.

In an Infiniband configuration containing an I/O Unit (IOU) that enables the host computing system connected to an Infiniband network to access I/O devices, the FCP I/O devices appear to the host as SRP I/O devices. Since all SRP I/O devices are uniquely identified by SRP target port identifiers (IDs), there is a one-to-one correspondence between the worldwide-unique port name (WWPN) for each FCP I/O device and a corresponding SRP target port identifier. SRP target port identifiers consist of two 64-bit quantities. The first is an "IOCGUID" that identifies the IOC that controls the SRP target port. The second is a 64-bit extension. For the case of an IB-to-FC adapter, the extension is set to the WWPN of the FCP I/O device corresponding to the SRP target port identifier. For example, the SRP target port identifier IOCGUID1.WWPNA corresponds to an FCP I/O device with WWPN equal to WWPNA that is accessible through an IOC with an IOCGUID equal to IOCGUID1; SRP target port identifier IOCGUID1.WWPNB corresponds to an FCP I/O device with WWPN equal to WWPNB this is also accessible through an IOC with IOCGUID equal to IOCGUID1; SRP target port identifier IOCGUID2.WWPNC corresponds to an FCP I/O device with WWPN equal to WWPNC that is accessible through an IOC with an IOCGUID equal to IOCGUID2; and so on.

In addition to a target port identifier, SRP I/O devices are identified by an IB "service name." IB service names uniquely identify "service providers," such as information databases, communication functions, or (as in this case) SRP I/O device functions. The SRP I/O device service name is a 40-byte UTF-8 character string. The first 24-bytes of the service name contains the following character string:
'SRP.T10:xxxxxxxxxxxxxxxx'

The "SRP.T10' part of the service name identifies the service as an SRP target port; the 'xxxxxxxxxxxxxxxx' part of the service name is a 16-byte hexadecimal encoding of the 64-bit "extension" portion of the SRP target port identifier. Note that in the case of IB-to-FC adapters, the 64-bit extension of the SRP target port identifier is set to the WWPN of the FCP I/O device corresponding to the SRP target port; therefore, the FCP I/O device corresponding to a particular service name can be deduced by examination of the 'xxxxxxxxxxxxxxxx' portion of the service name. The additional 16 bytes of the SRP service name contain null characters. An example of an SRP service name corresponding to an FCP I/O device with WWPN x'5347 9899 5348 8888' is 'SRP.T10:5347989953488888', followed by null characters.

Since the service name and SRP target port identifier formats described above contain the FC WWPN of the corresponding FCP I/O device, a host is able to generate the SRP service name for the SRP I/O device that corresponds to the FCP I/O device. Since hosts typically identify FCP I/O devices by their WWPNs, this enables an easy determination of the SRP service name for the corresponding SRP I/O device whenever the host needs to access a particular FCP I/O device with a given WWPN.

In order to access the SRP I/O device, however, the host also needs the IB address of the IB-to-FC adapter supporting the service. Prior to this invention, there was no efficient method by which a host could determine the IB address of the IB-to-FC adapter that supports the service name corresponding to the FCP I/O device. Therefore, without the use of this invention, a host attempting to access an FCP I/O device with a particular WWPN would need to poll all of the I/O units (IOUs) in the IB subnet in order to determine those IOUs which are IB-to-FC adapters. The host would then poll each IB-to-FC adapter to determine the particular IB-to-FC adapter (or adapters) that provide access to the FCP I/O device with the desired WWPN. Such a polling operation, which involves sending multiple queries to each IOU in the subnet, is impractical when the IB subnet is of any significant size, and results in unacceptable performance degradation.

SUMMARY OF THE INVENTION

This invention defines the means for efficiently storing and retrieving information about FCP I/O devices on an IB Subnet Administration Database. The method by which information is stored enables a host to rapidly determine the IB addressing parameters by which FCP I/O devices are accessed through the IB-to-FC adapter.

The shortcomings of the prior art, namely the lack of an efficient means to discover the IB address of the IB-to-FC adapter providing access to a particular FCP I/O device identified by a WWPN, are overcome by the registration of SRP service names on an IB subnet administration database, and by the querying of that database as described in this invention. Use of this invention decreases the complexity of host systems, improves their performance, and provides additional advantages as outlined below.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The foregoing and other objects, features, and advantages of the invention are apparent from the following detailed description taken in conjunction with the accompanying drawings in which:

FIG. 3 illustrates one example of an IB Service Record; and

FIG. 4 illustrates one example of a flow chart of the process of determining the IB address of the IB-to-FC adapter(s) providing access to a particular FCP I/O device.

The detailed description explains the preferred embodiments of the invention, together with advantages and features, by way of example with reference to the drawings.

DETAILED DESCRIPTION OF THE INVENTION

This invention provides host computing systems with the ability to efficiently identify the Infiniband (IB) addressing parameters which correspond to Fibre Channel I/O devices that are accessible through IB-to-Fibre Channel adapters. The invention can be subdivided into a configuration step and a look-up step. In the configuration step, the FCP I/O devices are registered in a database. In the look-up step, a host accesses the database in order to determine the IB addressing parameters of the IB-to-FC adapter that provides access to the FCP I/O device. These two steps are described in detail below.

Figure 1:
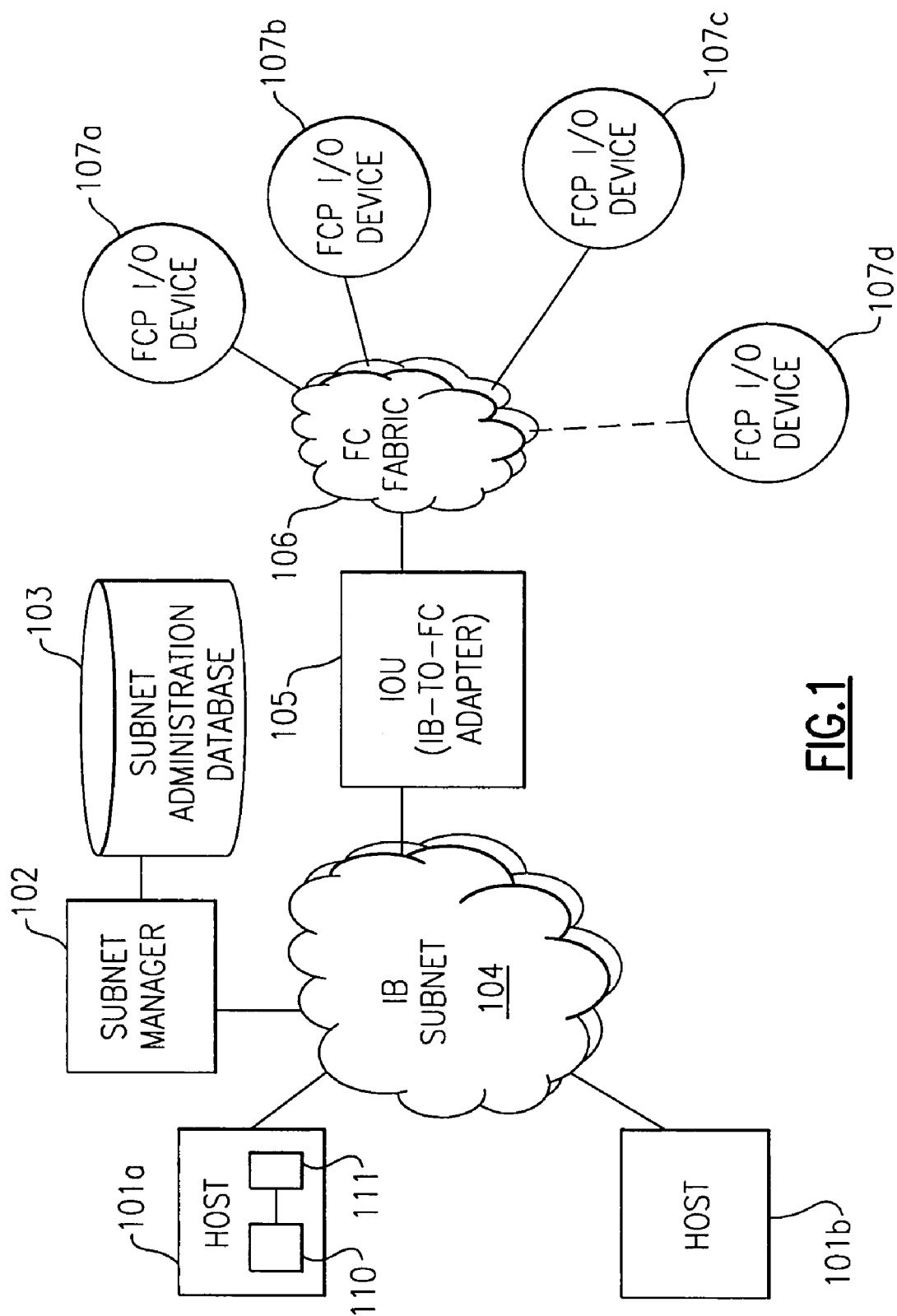
FIG. 1 illustrates one example of a network configuration containing an IB subnet, an FC fabric, and an IB-to-FC adapter which incorporates this invention.

Referring to FIG. 1, host systems 101a and 101b communicate with an IB-to-FC-adapter 105 through an IB subnet 104. The IB-to-FC adapter 105 communicates with the FCP I/O devices 107a-107d through the FC fabric 106. Each host system, for instance host system 101a, includes a processing unit 110 for executing data processions instructions, and a memory 111 for storing data to be processed and encoded processing instructions arranged in computer programs forming commands, requests and routines. The interface protocol between the host systems 101 and the IB-to-FC adapter 105 conforms to ref. 4. Each FCP I/O device 107a-107d appears to the host 101 as if it were an IB I/O device conforming to SRP (ref 4); therefore, the I/O devices 107 visible to the host 101 are referred to as SRP I/O devices even though they represent actual FCP I/O devices. The interface protocol between the IB-to-FC adapter 105 and the FCP I/O devices 107 conforms to the SCSI mapping onto FC (ref 3.).

Figure 2:
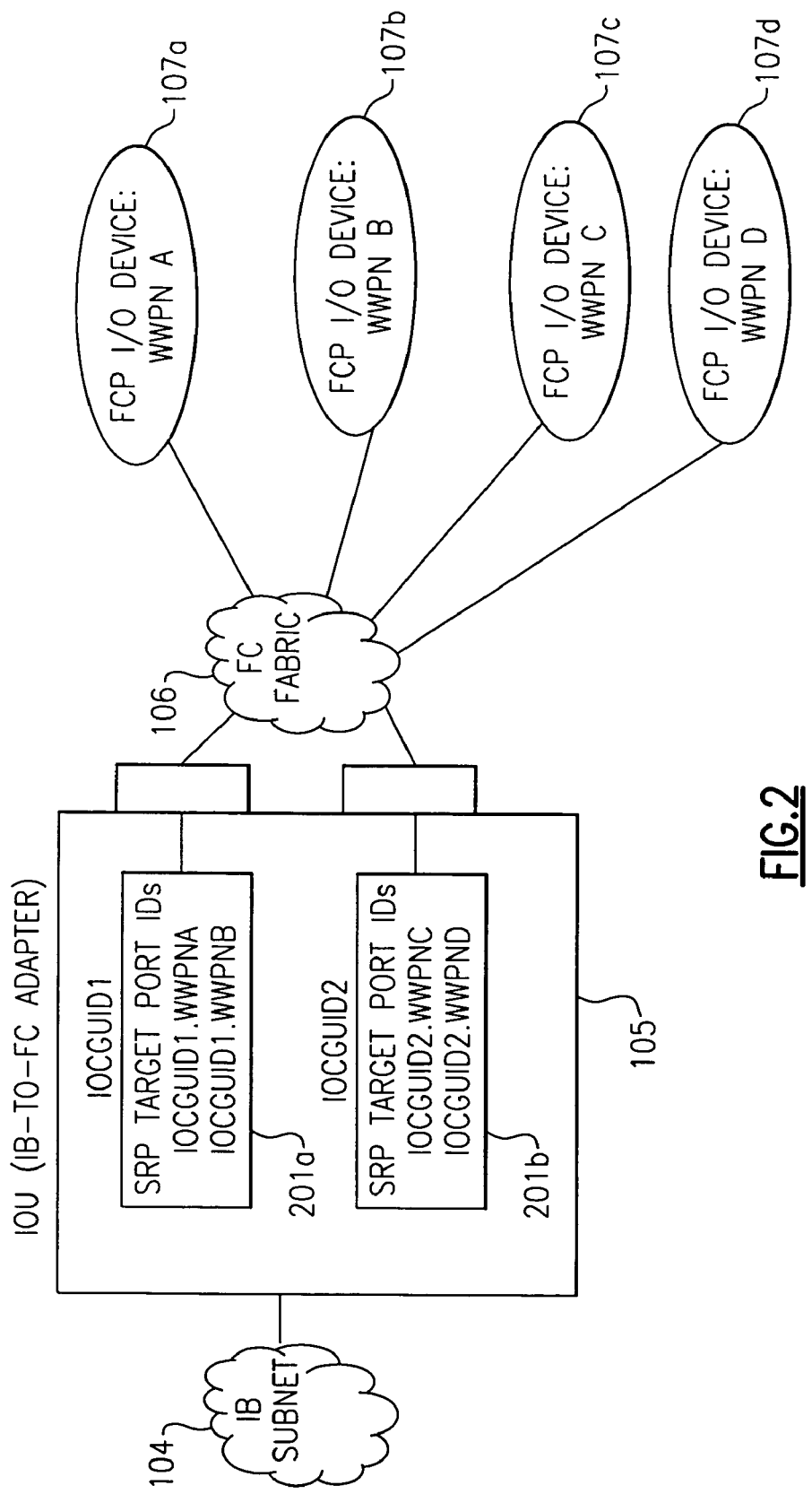
FIG. 2 illustrates one example of an IB-to-FC adapter and associated components which incorporates this invention.

FIG. 2 shows an expanded representation of an IB-to-FC adapter 105 containing two I/O controllers (IOCs), 201a and 201b. The IOCs 201 are attached to the FC fabric 106, which is attached to the FCP I/O devices 107a-107d. IOC 201a provides access to FCP I/O devices 107a and 107b, and IOC 201b provides access to FCP I/O devices 107c and 107d. All FCP I/O devices 107 are uniquely identified by a 64-bit "worldwide-unique" port name (WWPN). Thus, FCP I/O devices 107a-107d are uniquely identified by WWPN A through WWPN D.

Returning to FIG. 1, during a configuration step, each FCP I/O device 107a-107d is registered with the subnet administration (SA) database 103. This registration can be done by the IB-to-FC adapter 105, or it might be done by a third party such as another host which executes a configuration routine.

In order to register an FCP I/O device 107 with the SA database 103, it is necessary to store, in the SA database 103, an IB service record which identifies the FCP I/O device 107. This is accomplished by sending an IB datagram containing the SubnetAdminSet (ServiceRecord) command to the subnet manager 102. This command contains an IB service record, as shown in FIG. 3. The service record is stored in the subnet administration database 103. Referring to FIG. 3, the fields in the IB ServiceRecord which relate to this invention are the ServiceName 301 and ServiceData 302 fields. (The ServiceID, ServiceGID, ServiceP_Key, ServiceLease, and ServiceKey fields are used as specified in IB specifications, ref 1.)

The first 24 bytes of the 512 bit (64-byte) ServiceName field 301 are set to the first 24 bytes of the SRP service name corresponding to the FCP I/O device. These bytes are followed by the string '.FCP' followed by a sequence of null characters to fill the remaining bytes in the ServiceName field. The string '.FCP' is appended to the SRP service name to distinguish it from an SRP service name for an SRP I/O device that does not correspond to an FCP I/O device. Such a service name would contain null characters in the corresponding character positions.

The first 64-bits of the ServiceData field 302 are set to the IOCGUID of the IOC that provides access to the FCP I/O device. The remaining bytes in the ServiceData field are not used by this invention and may be set to any value. This completes the configuration step for the FCP I/O device; the configuration step is repeated for all FCP I/O devices accessible from the IB subnet.

Provided the above configuration steps have been completed, the host 101 is now able to determine the IB address of the IB-to-FC adapter 105 providing access to an FCP I/O device with a given WWPN by performing the steps shown in FIG. 4.

Referring to FIG. 4, the host sends a SubnetAdminGet (ServiceRecord) request (401) to the subnet manager 102 (SM). The request indicates that the SM 102 is to return all service records containing the service name corresponding to the service name registered for the FCP I/O device 107 during the configuration step. For example, to obtain the service records corresponding to the FCP I/O device with a WWPN of x'5347 9899 5348 8888', the host requests all service records containing a ServiceName field of 'SRP.T10: 5347989953488888.FCP', followed by null characters. The procedure for sending this request is described in IB specifications ref. 1.

If an IB-to-FC adapter 105 in the IB subnet 104 provides access to the FCP I/O device 107 identified by the SubnAdminGet (ServiceRecord) request, then the response contains at least one service record corresponding to the FCP I/O device; if the response does not contain any service records, then the device is not accessible (402), and the procedure terminates.

Assuming the response contained at least one service record, then for each service record, a host 101 determines the IB addressing parameters necessary to access a FCP I/O device 107 as follows:

1. In step 403, the host 101 determines the IB addressing parameters of the IB-to-FC adapter 105 by converting the ServiceGID field into an IB "path." The procedure for doing this is described in IB specifications.
2. In step 404, the host 101 determines the IOC 201 providing access to the FCP I/O device 107 by extracting the 64-bit IOCGUID from the ServiceData field. Note that the IOCGUID was stored in the ServiceData field 302 during the configuration step for the FCP I/O device 107.
3. In step 405, the host 101 constructs an SRP target port identifier corresponding to the FCP I/O device 107 by concatenating the IOCGUID and the WWPN of the I/O device 107. That is, the SRP target port identifier is set to IOCGUID.WWPN.
4. In step 406, the host 101 accesses the I/O device 107 by performing the procedures outlined in SRP specifications, ref 4.

The above steps are repeated for each service record returned in response to the SubnAdminGet(ServiceRecord) request. Performing the sequence of steps for each service record results in the identification of an all physical paths to the FCP I/O device 107 through the IB subnet 104 and FC Fabric 106. The physical paths may include access through different IB-to-FC adapters, different IOCs within each adapter, different ports on the FC fabric, and different routes through the fabric.

Note that the above process did not require the host to poll multiple IOUs in the subnet prior to accessing the I/O device, as would have been required prior to this invention. Additionally, the host does not need to poll all the IOCs within an IOU in order to determine the IOC supporting the service name corresponding to the FCP I/O device. Prior to this invention, the host needed to poll up to 256 IOCs in each IOU in order to determine the desired IOC. Instead of performing all the above polling operations—an unacceptably long process, a host is able to determine all the physical paths to the FCP I/O device by sending a single request to the subnet administration database.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of identifying in an Infiniband subnetwork, Fibre Channel I/O devices in a network comprising:
   during a configuration step, registering with a subnet manager, in a service record in a database in the Infiniband subnetwork, a worldwide-unique service name corresponding to a Fibre Channel I/O device;
   appending a unique suffix to the service name identifying to the Infiniband subnetwork, the service name as the name of a particular Fibre Channel I/O device; and
   accessing from said Infiniband subnetwork, said Fibre Channel I/O device by looking up the registered service name and appended suffix in the database without polling.

2. The method according to claim 1 further comprising storing additional addressing parameters pertaining to the Fibre Channel I/O device in other fields of the service record.

3. The method according to claim 2 further comprising sending a request from a host to said subnet manager of the database, said request including parameters enabling all service records pertaining to a Fibre Channel I/O device to be returned to the host such that the host has access the I/O device.

4. The method according to claim 3 further comprising identifying all physical paths for the host in the network to said Fibre Channel I/O device by examining the response to a single request to the subnet manager of the database.

5. The method of claim 4 wherein the network includes an IOU adapter providing access to the Fibre Channel I/O device, and identifying the Fibre Channel I/O device includes identifying the IOU adapter such that access to the Fibre Channel I/O device does not require polling the IOU adapter.

6. The method of claim 5 wherein the addressing parameters includes indicating that the Fibre Channel I/O device is inaccessible such that addressing the Fibre Channel I/O device determines that the Fibre Channel I/O device is inaccessible without polling the IOU adapter.

7. The method according to claim 6 wherein said additional addressing parameters includes the IOCGUID pertaining to the Fibre Channel I/O device.

8. The method according to claim 7 wherein the additional addressing parameters include identifying a corresponding SCSI Remote Direct Memory Access Protocol (SRP) I/O device which provides access to the Fibre Channel I/O device.

9. The method according to claim 1 wherein said unique suffix is the string '.FCP' followed by a sequence of null characters to fill the remaining bytes in the service name field.

* * * * *

UNITED STATES PATENT AND TRADEMARK OFFICE
CERTIFICATE OF CORRECTION

PATENT NO. : 7,620,695 B2  Page 1 of 1
APPLICATION NO. : 10/725778
DATED : November 17, 2009
INVENTOR(S) : Giles R. Frazier It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1326 days.

Signed and Sealed this

Twenty-sixth Day of October, 2010

David J. Kappos
*Director of the United States Patent and Trademark Office*